Dec. 10, 1968     W. J. CHAMPAGNE     3,415,167
LOCKING CYLINDER
Filed Oct. 20, 1966
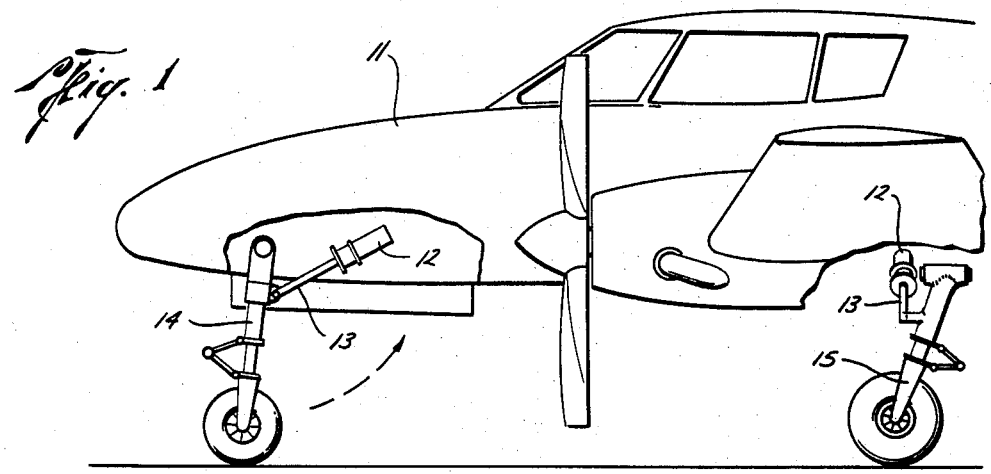
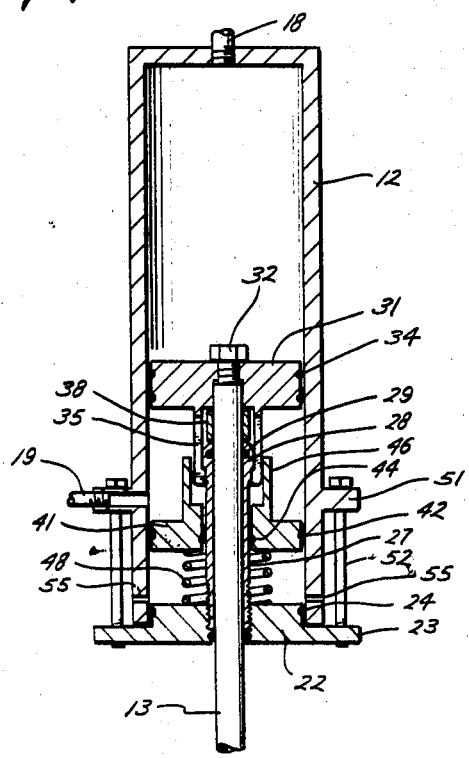
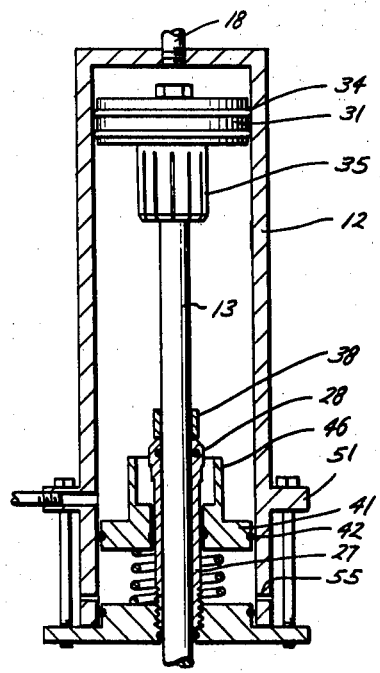
Whitney J. Champagne
INVENTOR.
BY *Lee R Larkin*
ATTORNEY

United States Patent Office 3,415,167
Patented Dec. 10, 1968

3,415,167
LOCKING CYLINDER
Whitney J. Champagne, Theriot, La.
(Box 114, Dularge Rte., Houma, La. 70360)
Filed Oct. 20, 1966, Ser. No. 588,022
6 Claims. (Cl. 92—26)

ABSTRACT OF THE DISCLOSURE

A locking cylinder that is arranged to be locked in in the extended position. It is so designed that the cylinder may be removed from the assembly for repair purposes and the like while the apparatus remains locked.

---

This invention relates to a locking cylinder. More particularly, this invention relates to a fluid pressure actuator and locking mechanism for connection between two members which are movable relative to each other and for locking said members in a fixed relationship upon actuation thereof.

There has long been need for a locking cylinder which can be moved to the locked position and thereafter left in the locked position while repairs are made thereto. For example, locking cylinders have been used on various type devices such as oil field blowout preventors, aircraft landing gears and the like. However, in the prior art devices, none of the locking cylinders are so arranged that repairs can be made thereto while the cylinder remains in the locked position. Hence, if the cylinder should develop a leak, it is possible that the cylinder could be moved to the unlocked position at an inappropriate time. Moveover, in the prior art devices, it has been difficult to repair defective cylinders while maintaining the cylinder in the locked position.

It is, therefore, an object of this invention to provide an improved locking cylinder which will overcome the foregoing problems.

Briefly stated, this invention is for a fluid pressure actuator and locking mechanism for connection between two members which are movable relative to each other. The mechanism comprises a cylinder having means for separately applying pressurized fluid into each end thereof. It is provided with base means which are adapted for closing one end of the cylinder and for attachment to one of the aforesaid members. A first piston means is mounted in the cylinder for movement to and from a limit position therein in response to fluid pressure alternately applied to the opposite sides thereof. Piston rod means are provided, one end of which is connected to the piston means and the other end of which is connected to the other of said members. The device includes latching means which are associated with the piston means and the base means for latching the piston means in the limit position. Locking means are also provided and adapted to lock the latching means in the locked position when the piston means is in the limit position. The locking means are adapted to move to the unlocked position in response to fluid pressure applied to move the piston means from the limit position. The apparatus also includes mounting means detachably securing the cylinder to the base means whereby the cylinder may be removed while the mechanism remains in the locked position.

Reference to the drawings will further explain the invention wherein like numerals refer to like parts and in which:

FIG. 1 is perspective view, partially broken away, showing an airplane having two of the locking cylinders of this invention mounted therein.

FIG. 2 is a vertical central sectional view of a locking cylinder made in accordance with this invention, showing the cylinder in the locking position.

FIG. 3 is a view similar to FIG. 2, but showing the cylinder in the unlocked position.

Referring now to FIG. 1, airplane 11 is shown having two cylinders 12, each of which has a piston rod 13 mounted thereon. One of the cylinders 12 and piston rod 13 is connected between the movable front landing gear 14 and a fixed bracket (not shown) on plane 11. Another of the cylinders 12 and its associated piston rod 13 is connected between rear landing gear 15 and a bracket (not shown) connected to plane 11. In both instances, cylinders 12 are connected between two members which are movable relative to each other, i.e., to and from the landing position. FIG. 1 shows locking cylinders 12 in the locked position, i.e., with the landing gears locked down.

FIG. 2 shows the arrangement of the locking cylinder in the locked position and it includes cylinder 12, inlet 18 in the upper end thereof for passage of fluid in and out of the cylinder 12, and inlet 19 for passage of fluid in and out of the other end of cylinder 12.

Base means are provided which are adapted for closing one end of cylinder 12 and for attachment to one of the members, i.e., the airplane, which takes the form of annular mounting base 22 having an enlarged external flange 23 and provided with O-ring seal 24 between the internal surface of cylinder 12. It is to be understood that base 22 is adapted for securing to the airplane in any convenient means in a fixed relationship therewith.

Base 22 has threadably secured thereto and extending upwardly therefrom inner locking sleeve 27, the upper end of which is provided with an enlarged portion 28 forming an annular downwardly facing shoulder, and an internal O-ring seal 29 which seals against piston rod 13 movable therein.

The upper end of piston rod 13 is connected to a first piston 31 by means of nut 32 secured to the upper end of piston rod 13. Piston 31 has a pair of O-ring seals 34 thereabout which seal with the internal surface of cylinder 12. Piston 31 has a plurality of latching fingers 35 depending therefrom which have radially inwardly extending lugs or projections which are arranged to generally surround and engage the downwardly facing shoulder of portion 28 as shown. Hence, portion 28 and fingers 35 are latched together and may sometimes be referred to as the latching means. Fingers 35 may be made by providing a tubular section with a plurality of longitudinal cuts. During movement of piston 31 to the locked position shown in FIG. 1, fingers 35 would be cammed radially outward over portion 28 and thereafter spring radially inward after the lower ends of fingers 35 pass over portion 28. A generally cylindrical spacer bushing 38 is provided between piston 31 and inside of fingers 35 to control the distance that fingers 35 travel relative to sleeve 27.

The locking means of this invention include a second piston 41 having an O-ring seal 42 thereabout for sealing engagement with the internal surface of cylinder 12, and another O-ring seal 44 for sealing engagement with the external surface of sleeve 27. Piston 41 has attached thereto a movable locking sleeve 46 which extends upwardly therefrom and which surround fingers 35, thereby holding fingers 35 in the locked position shown. Piston 41 is adapted for movement to the locked position by biasing means in the form of coil spring 48 surrounding sleeve 27 and resting on base 22 at the lower end thereof. The tension of spring 48 is selected such that fluid pressure applied to the upper side of piston 41 will overcome the force exerted by spring 48, such that piston 41 may move downwardly such that sleeve 46 is moved from the locking position and out of engagement with fingers 35.

Mounting means for detachably securing cylinder 12 to base 22 are provided in the form of annular flange 51 formed about the lower portion of cylinder 12. Flange 51 is adapted for securing to base 22 by a means of a plurality of removable bolts 52 passing downwardly through flange 51 and threading into flange 23.

In operation, let it be assumed that the cylinder is in the locked position shown in FIG. 2. Fluid pressure can thereafter be applied through inlet 19 which simultaneously applies an upward force on piston 31 and a downward force on piston 41, which pressure is sufficient to overcome spring 48 thereby moving sleeve 46 downwardly and away from engagement with fingers 35. When sleeve 46 has cleared fingers 35, the upward pressure on piston 31 causes fingers 35 to spring slightly outward and over the enlarged portion 28 thereby unlocking the cylinder. Continued application of pressure through inlet 19 will cause piston 31 to move to the upward position shown in FIG. 3. This would be the position of the cylinders in FIG. 1 in the retracted position, i.e., when landing gears 14 and 15 are moved to the retracted position.

When it becomes desirable to move the cylinder back to the locked position, then pressure would be relieved on inlet 19 and subsequently applied to inlet 18, thereby driving piston 31 downward. The lower ends of fingers 35 would contact the upper end of sleeve 46 and carry it downwardly as fingers 35 moved over enlarged portion 28. When fingers 35 had moved over the downwardly facing shoulder of portion 28, then piston 41 would be moved upwardly by spring 48 such that sleeve 46 would then surround fingers 35 in the locked position shown in FIG. 2. During this downward movement, pressure would be relieved from the space below piston 41 through small orifices 55 in the wall of cylinder 12 which are provided in the lower portion thereof. Similarly, during the upward movement of piston 41, air would move through orifices 55 into the space below piston 41. In other words, orifices 55 act as relief ports to compensate for the movement of piston 41 up and down within cylinder 12.

One of the particular advantages of this arrangement of a locking cylinder is that when the piston 31 is moved to the locked position, as shown in FIG. 2, and if it should thereafter develop that there was a loss of fluid pressure, as for example, if one of the O-ring seals which seal the internal surface of cylinder 12 should become defective, cylinder 12 can be removed while pistons 31 and 41 remain in the locked position and the necessary repairs made thereto. It is this demountable feature which is a great safety factor in insuring that the cylinder remains in the locked position and in providing an opportunity for repairing the cylinder if that should occur. Cylinder 12 can be removed by removing bolts 52 and moving upwardly on cylinder 12. During this movement, piston 31 will continue to be in the locked position since spring 48 will continue to hold sleeve 46 in the locked position. In other words, the locking cylinder of this invention is hydraulic but becomes mechanical once it is locked in position.

The locking cylinder of this invention can be useful in connection with blowout preventors or valves on high pressure lines, for example, so long as there are two members which are movable relative to each other. Other uses of the cylinder of this invention would be on a service station grease rack, for example, to lock the grease rack in the raised position, or on large oven doors where it is important to lock a door in either an open or closed position.

The cylinder of this invention is relatively simple in construction, easy to operate, easy to repair, and may be repaired while the piston remains in the locked position as described above.

What is claimed is:

1. In a fluid pressure actuator and locking mechanism for connection between two members which are movable relative to each other, the combination comprising:
   a cylinder having means for applying pressurized fluid to each end thereof at predetermined times;
   base means arranged for closing one end of said cylinder and for attaching to one of said members, said base means having an opening for receiving a piston rod therethrough;
   first piston means mounted in said cylinder for movement to and from a fully extended stroke end position adjacent said base means in response to fluid pressure alternately applied to the opposite sides thereof;
   a piston rod connected to said first piston means at one end for movement therewith and adapted for connection at the other end thereof to the other of said members and mounted for reciprocal movement in said opening in said base means;
   a fixed sleeve mounted around said piston rod and connected at one end to said base means and having a latch finger engaging shoulder at the other end thereof;
   a plurality of resilient latch fingers connected to said first piston means for engagement in a latching position with said shoulder when said first piston means is moved to said end position;
   locking means adapted to lock said latch fingers in the locked position when said first piston means is in said end position, said locking means being adapted to move to the unlocked position in response to fluid pressure applied to move said first piston means away from said end position;
   and mounting means for detachably securing said cylinder to said base means and permitting said cylinder to be removed while said mechanism remains in the locked end position.

2. In the invention as claimed in claim 1 wherein said locking means includes:
   a second piston means mounted in said cylinder near the base end thereof and adapted for movement toward the base end of said cylinder in response to fluid pressure applied to move said first piston means away from said end position;
   biasing means for normally urging said second piston means in a direction away from the base end of said cylinder;
   and retaining means carried by said second piston means for securing said latching means in the locked position.

3. In the invention as claimed in claim 2 wherein:
said retaining means is in the form of a movable sleeve carried by said second piston means, said sleeve being arranged to engage and hold said latch fingers in the locked position.

4. In the invention as claimed in claim 3 wherein:
said latch fingers have radially inwardly projecting lugs arranged to engage said shoulder in latched position.

5. In the invention as claimed in claim 4 wherein:
said cylinder is provided with vent means near the base end thereof for venting the space between said second piston means and said base means to the atmosphere.

6. In the invention as claimed in claim 5 wherein:
said piston rod is solid in cross section;
and said plurality of resilient latch fingers are at least three in number.

References Cited

UNITED STATES PATENTS

| | | | |
|---|---|---|---|
| 3,177,780 | 4/1965 | Andersen et al. | 92—94 |
| 829,233 | 8/1906 | Russell | 92—161 |
| 1,326,882 | 12/1919 | Stratton | 292—256.73 |
| 1,832,341 | 11/1931 | Williamson | 92—161 |

(References on following page)

| | | | |
|---|---|---|---|
| 2,333,274 | 11/1943 | Scannell | 92—24 X |
| 2,434,828 | 1/1948 | Ashton et al. | 92—24 |
| 2,550,601 | 4/1951 | Rosenberg | 92—161 X |
| 2,771,060 | 11/1956 | Allbright | 92—24 |
| 3,003,471 | 10/1961 | Bodem et al. | 92—24 X |
| 3,228,307 | 1/1966 | Dillard | 92—26 |
| 3,314,335 | 4/1967 | Gulick | 92—26 |

FOREIGN PATENTS 778,242   7/1957   Great Britain.

MARTIN P. SCHWADRON, *Primary Examiner.*

I. C. COHEN, *Assistant Examiner.*

U.S. Cl. X.R.

92—128